(12) United States Patent
Urbano et al.

(10) Patent No.: US 6,265,461 B1
(45) Date of Patent: Jul. 24, 2001

(54) HIGH-SOLIDS, RADIATION-CURABLE WATER-SOLUBLE COMBINATIONS OF POLYESTER RESINS

(75) Inventors: Edmund Urbano; Ulrike Kuttler; Martin Gerlitz; Rami-Raimund Awad, all of Graz (AT)

(73) Assignee: Vianova Resins AG, Werndorf (AT)

( * ) Notice: Subject to any disclaimer, the term of this patent is extended or adjusted under 35 U.S.C. 154(b) by 0 days.

(21) Appl. No.: 09/383,091

(22) Filed: Aug. 25, 1999

(30) Foreign Application Priority Data

Aug. 27, 1998 (AT) ................................................ A1455/98

(51) Int. Cl.$^7$ ......................... C09D 167/07; C08L 67/07; C08F 2/50; C08J 3/28; C08G 63/47

(52) U.S. Cl. .............................. 522/111; 522/84; 522/86; 522/104; 522/108; 522/179; 524/845; 525/437; 525/444

(58) Field of Search .................................. 522/84, 85, 86, 522/104, 108, 111, 179; 524/845; 525/437, 444, 445

(56) References Cited

U.S. PATENT DOCUMENTS

| | | | |
|---|---|---|---|
| 4,073,777 | * | 2/1978 | O'Neill et al. . |
| 4,585,828 | * | 4/1986 | Meixner et al. . |
| 4,822,829 | * | 4/1989 | Muller et al. . |
| 4,921,883 | * | 5/1990 | Meixner et al. . |
| 5,102,976 | * | 4/1992 | Kressdorf et al. . |
| 6,011,078 | * | 1/2000 | Reich et al. . |

FOREIGN PATENT DOCUMENTS

| | | |
|---|---|---|
| 33 40 589 A1 | 5/1985 | (DE) . |
| 197 18 948 A1 | * 11/1998 | (DE) . |
| 0 425 947 A2 | 5/1991 | (EP) . |
| 0 574 775 A1 | 12/1993 | (EP) . |

* cited by examiner

Primary Examiner—Susan W. Berman
(74) Attorney, Agent, or Firm—Frommer Lawrence & Haug LLP

(57) ABSTRACT

Radiation curable polyester composition AB, capable of forming solutions or dispersions in water of high solid content which can be produced by mixing or pre-condensing a water soluble, radiation-curable emulsifying resin A which contains ester and acid groups and has an acid number from 20 to 300 mg/g and water-insoluble, radiation-curable polymer B containing ester and/or ether groups, wherein resin A is a reaction product of an alkoxylated polyol A1 having at least 3 hydroxyl groups and 3 to 10 oxyalkylene units per molecule, these oxyalkylene units containing 2 to 4 carbon atoms each, with an α, β-unsaturated carboxylic acid A2 having each a free carboxyl group per molecule, and a carboxylic acid A3 which is at least tri-functional and wherein polymer B is a reaction product of aliphatic, linear, branched or cyclic alcohols B1 with compounds B2, selected from alkylene oxides B21, dicarboxylic acids B22 and aliphatic lactones B23 having 4 to 12 carbon atoms as well as compounds B3 selected from α,β-unsaturated carboxylic acids with 1 to 2 carboxyl groups in the molecule, aqueous coating compositions made therefrom, and a method of using these for coating of heat-sensitive substrates.

15 Claims, No Drawings

HIGH-SOLIDS, RADIATION-CURABLE WATER-SOLUBLE COMBINATIONS OF POLYESTER RESINS

BACKGROUND OF THE INVENTION

1. Field of the Invention

The present invention pertains to radiation-curable water-soluble combinations of polyester resins with high mass fraction of solids.

2. Description of the Related Art

From EP-A 0 574 775 self-emulsifying polymerizable binders are known which can be made by reacting pre-polymers containing (meth)acryloyl groups (A) and unsaturated polyesters (B) which are emulsifiable in water with multifunctional isocyanates. The preferred pre-polymers (A) containing (meth)acryloyl groups are polyester (meth) acrylates which are condensation products of aromatic and/or aliphatic dicarboxylic acids (A1), especially those of malonic, succinic, glutaric, adipic, sebacic, hexahydrophthalic, terephtalic, maleic, fumaric, citraconic and itaconic acids or their anhydrides, of polyols (A2), especially glycol, 1,2- and 1,3-propanediol, diglycol, dipropylene glycol, butanediol, etc., and α, β-unsaturated monocarboxylic acid derivatives (A3). The polyesters which are emulsifiable in water are the condensation products of the dicarboxylic acids referred to under (A1) and the polyols referred to under (A2) as well as of a polyether alcohol such polyethylene and polypropylene glycol and alcohols having, an allyl ether functionality. Using these polyesters, dispersions with a mass fraction of solids of approx. 50% can be produced.

From EP-A 0 425 974, water-soluble binders with at least one polymerizable double bond are known which may be produced by condensation of at least one polyoxy-alkylene glycol with a molar mass of from 300 to 800 g/mol, or optionally from one polyoxy-alkylene glycol with a molar mass of less than 300 g/mol, at least one alkoxylated trivalent alcohol, or optionally at least one alkoxylated tetra to hexavalent alcohol, at least one polycarboxylic acid or a derivative of a polycarboxylic acid and at least one monocarboxylic acid of a derivative thereof.

From DE-A 33 40 589, radiation-curable water-soluble polyesters containing acryloyl groups are known which contain co-condensed units of a dicarboxylic anhydride, a polyether alcohol, a bivalent alcohol and a trivalent alkoxylated alcohol and acrylic acid. Dispersions with a mass fraction of solids of approx. 50% can be produced using these polyesters.

OBJECT OF THE INVENTION

However, it was now discovered that a composition comprising an emulsifying resin A containing acid groups and a radiation-curable water-insoluble polymer B, which is either a mixture of these two components without chemical reaction or a reaction product which can be produced from these two component by means of a condensation reaction, can homogeneously be dissolved or dispersed in water up to a mass fraction of solids of about 75%; and that coatings which can be made from it can be hardened by high-energy radiation (UV light or electron beams) into a covering which is resistant to mechanical and chemical influences.

SUMMARY OF THE INVENTION

Therefore, the subject matter of the invention is a radiation-curable polyester composition AB which dissolves in water or can be dispersed in water to solutions or dispersion with a high solid content. The inventive polyester composition AB is produced by mixing or pre-condensing of a water-soluble radiation-curable emulsifying resin A, which contains ester and/or acid groups and has an acid number from about 20 to about 300 mg/g (preferably from about 60 to about 250 mg/g), and of a radiation-curable water-insoluble polymer B, which contains ester and/or ether groups. Resin A is a reaction product of an alkoxylated polyol A1 with at least 3 hydroxyl groups per molecule and 3 to 10 oxyalkylene units per molecule, these oxyalkylene units containing 2 to 4 carbon atoms, with an α, β-unsaturated carboxylic acid A2, with one free carboxyl group per molecule, and a carboxylic acid A3. Carboxylic acid A3 is selected from carboxylic acids A31, having at least two carboxylic groups wherein at least one of these is a secondary or tertiary carboxylic group (i.e. the carboxylic group is linked to a carbon atom which in turn are linked to two or three carbon atoms) as well as a further acid group selected from carboxylic acid groups, sulphonic and phosphoric acid groups, and carboxylic acids A32 with at least two carboxylic groups and at least one hydroxyl group which is acidic by adjacent electronegative substitution (with a pKa-value of up to about 8). Polymer B is a reaction product of aliphatic, linear, branched or cyclic alcohols B1 with compounds B2 selected from alkylene oxides B21 having 2 to 4 carbon atoms, aliphatic, linear, branched or cyclic dicarboxylic acids B22, having 3 to 8 carbon atoms, and aliphatic lactones B23 having 4 to 12 carbon atoms, as well as compounds B3 selected from α, β-unsaturated carboxylic acids with 1 to 2 carboxyl groups in the molecule.

In this context a "high solid content" means having a mass fraction of solids exceeding about 55%, preferably exceeding about 65% and particularly preferred in excess of about 70%.

DESCRIPTIONS OF THE PREFERRED EMBODIMENTS

The alkoxylated polyols A1 are conversion products produced in the known manner from alkylene oxides A11 and aliphatic, linear, branched or cyclic compounds A12 with at least three hydroxyl groups per molecule.

The alkylene oxides A11 are aliphatic 1,2-epoxides, selected from ethylene oxide (oxirane), 1,2-propylene oxide (methyloxirane) and 1,2-butylene oxide (ethyloxirane). Particularly preferred is oxirane.

The aliphatic polyols A12 have at least three carbon atoms and at least three, preferably 3 to 6 hydroxyl groups per molecule. Examples are glycerine, trimethylol ethane and trimethylol propane, erythritol, pentaerythritol, arabitol, xylitol and adonitol, sorbitol, mannitol and dulcitol as well as the ether polyols such as ditrimethylol propane and dipentaerythritol. Mixtures of these polyols may also be used.

As α, β-unsaturated carboxylic acids A2 are suited, for example, aliphatic monocarboxylic acids such as acrylic and methacrylic acid as well as crotonic, isocrotonic and vinylacetic acids, furthermore the monoesters of α, β-unsaturated dicarboxylic acids and aliphatic alcohols with 1 to 8, preferably with 1 to 4 carbon atoms. Among the latter monomethylmaleate and fumarate as well as monomethyl-, monoethyl-, monobutylesters of the itaconic, citraconic and mesaconic acids should be named. Particularly preferred are acrylic and methacrylic acids as well as monomethylmaleate. Mixtures of these acids may also be used.

The carboxylic acids A3, which can be used for the invention, have at least two carboxyl groups and a further acidic group per molecule. In this context the acidic groups are of differing reactivity which is characterised, for example, by the $pK_a$ value. Preferably, they should at least possess one additional acidic hydroxyl group (A32) or an additional acidic group (A31) per molecule. They possess preferably at least 3 carbon atoms and may possess an aliphatic, linear, branched or cyclic or an aromatic as well as mixed aromatic-aliphatic structure. Suitable among the hydroxycarboxylic acids are A32 tartronic (hydroxymalonic acid) and malic acid (hydroxysuccinic acid), the isomers of tartaric acid (dihydroxysuccinic acid) as well as the citric and isocitric acids. Among the acids A31 with differing reactivity the tricarballylic and sulfoisophthalic acids should be named.

For the synthesis of the water-insoluble radiation-curable polymers B, aliphatic, linear, branched or cyclic alcohols B1, with not less than two hydroxyl groups per molecule, are used in the first stage. These alcohols are preferably selected from the dihydroxy compounds with two to six carbon atoms such as ethylene glycol, 1,2-propylene glycol, 1,4-butanediol, 1,6-hexanediol, diethylene glycol, triethylene glycol and neopentyl glycol. Also preferred are hydroxy compounds with three or more hydroxy groups (such as named hereafter) and mixtures of hydroxy compounds with an average hydroxyl functionality of about 2.1 to about 3.5. Such mixtures comprise, for example, of ethylene glycol, di- and triethylene glycol with trivalent alcohols such as glycerol, trimethylol ethane and propane, or tetra- and multivalent alcohols such as erythritol, pentaerythritol, mannitol, ditrimethylol propane, dipentaerythritol and sorbitol.

The alcohols B1 are reacted in the first stage with compounds B2 selected from alkylene oxides B21, dicarboxylic acids B22 and lactones B23. In doing so polyether polyols or polyester polyols are formed.

The alkylene oxides B21 are oxiranes which optionally may carry substituents linked to their carbon atoms. Such substituents are selected from alkyl and alkoxy groups with 1 to 8 carbon atoms which may be linear, branched or cyclic. The substituents may also form a ring, for example in the case of the epoxide from cyclohexene and cyclooctene. Preferred are 1,2-epoxides derived from alkenes with a terminal double bond, especially oxirane (ethylene oxide), methyloxirane (propylene oxide) and ethyl oxirane (1,2-epoxybutane). In the reaction of the polyols B1 with the oxiranes B21 polyether polyols are formed. To limit the functionality of the polyether polyols in this step also monocarboxylic acids B24, preferably aromatic monocarboxylic acids, for example, benzoic acid may be used.

In reacting the polyols B1 or the polyether polyols derived from the polyols B1 and the oxiranes B21 with polycarboxylic acids, preferably dicarboxylic acids, polyester polyols are formed. It is also possible to react mixtures of the polyols B1 and the polyether polyols formed from B1 and B21, with the carboxylic acid component B22. For the invention it is required that in the component B there is on average at least one unsaturated group in the molecule and therefore the amount of substance of the carboxylic acid component B22 must be selected in such a manner that the conversion product formed by the reaction of polyol and carboxylic acid components still possesses at least one hydroxyl group per molecule. As carboxylic acids B22 both aliphatic and aromatic polycarboxylic acids are used. Preferred are the linear and the cyclic aliphatic dicarboxylic acids such as glutaric acid, adipic acid, o-, m-, and p-hexahydrophthalic acid, 1,12-dodecanedioic acid, and aromatic dicarboxylic acids such as iso- and terephthalic acid, diphenylsulfone dicarboxylic acid and diphenylether dicarboxylic acids.

A further possibility is the conversion of the polyols B1 with lactones B23 by ring opening. In doing so the polyols formed have the same number of hydroxyl groups as the polyol which was used initially. Suitable lactones are the inner esters of aliphatic hydrocarboxylic acids with 4 to 12 carbon atoms, such as γ-butyrolactone, δ-valerolactone, ε-caprolactone and the lactone of the 12-hydroxylauric acid. To limit the functionality of the polyether polyols in this step monocarboxylic acids B24, preferably aromatic monocarboxylic acid, for example, benzoic acid may also be used.

In a second step the polyether or polyester polyols are converted with an α, β-unsaturated mono- or dicarboxylic acid B3 to water-insoluble unsaturated polyesters B, preferably in the presence of polymerization inhibitor, for example, hydroquinone or butylated hydroxytoluene (BHT).

Suitable components for B3 are, in particular, the olefinic unsaturated aliphatic monocarboxylic acids, such as acrylic acid, methacrylic acid, vinylacetic acid, crotonic and isocrotonic acids, the unsaturated dicarboxylic acids, such as maleic, fumaric, itaconic, citraconic, mesaconic acids, as well as the semi-esters of these acids with aliphatic alcohols, especially those having 1 to 4 carbon atoms, such as methanol, ethanol, n- and iso-propanol, n-, iso-, secondary and tertiary butanol. Particularly preferred are acrylic and methacrylic acid and the monomethyl and monobutylester of maleic acid.

The polyester compositions produced in accordance with the invention are at least partially neutralised by the addition of aqueous alkali, aqueous solution of ammonia or amines, preferably to at least 30% and especially preferred to more than 50%. Subsequently these are made into dispersions or solutions in the known manner by the addition of deionised or distilled water. While the radiation-curable polyester combinations in line with the known state of the art can only be processed into aqueous solutions or dispersion with mass fractions of solids up to 50% and maximally up to approx. 70%, it is possible by applying this invention to polyester combinations to reach markedly higher mass fractions of solids to approx. 75% and even above which remain stable in storage.

The aqueous radiation-curable lacquers are particularly suitable for the coating of heat sensitive substrates, such as plastics, paper, cardboard, tissues and non-woven (material), leather and wood. In formulating the lacquers the customary ancillary materials such as pigments, levelling agents and wetting agents may be used. The polyester combination is, however, particularly suitable for the production of clear lacquers.

After applying to the substrate the lacquer is cured by high-energy radiation, especially UV light.

The cured coating layer is elastic and it is stable against mechanical impact and chemical attack. The coatings made with the lacquer display excellent transparency and high gloss. The advantageous properties are also retained after weathering (irradiation, impact of humidity, temperature cycles).

EXAMPLES

The invention is explained in more detail on the basis of the following examples:

In the following examples, just as in the preceding texts, all details given with the unit % mean mass fractions unless stated otherwise. "Parts" always means parts by mass.

Concentration given in "%" are mass fractions of the material dissolved in the solution.

The acid number in accordance with the German Industrial Standard DIN 53 402 is defined as the quotient of that mass $m_{KOH}$ of potassium hydroxide which is required to neutralize the sample to be investigated and the mass $m_B$ of this sample (mass of the solids in the sample from solutions and dispersions); expressed in the customary unit of "mg/g".

The hydroxyl number is defined by the German Industrial Standard (DIN) 53 240 as the quotient of that $m_{KOH}$ of potassium hydroxide exhibiting the same number of hydroxyl groups as the sample to be tested and the mass $m_B$ of this sample (mass of the solid matter in the sample in the case of solutions or dispersions), its customary unit is "mg/g".

Examples
Component A (Emulsifying Resin=Water-Soluble Polyester Acrylate)

Example A1

356 g of pentaerythritol which was alkoxylated with 5 mol ethylene oxide per 1 mol pentaerythritol ("Penta 5 EO") were esterified with 216 g of acrylic acid by means of azeotropic distillation at 130° C. in the presence of 0.5 g p-toluenesulphonic acid and 1 g hydroquinone using toluene as azeotrope former up to an acid number of less than 5 g/mg. Subsequently 96 g of citric acid was added and the esterification was continued to an acid number of 95 mg/g with distilling off the azeotrope former under reduced pressure. 590 g emulsifying resin A1 were obtained.

Example A2

Example 1 was repeated with 192 g of citric acid. 688 g of an emulsifying resin A2 with an acid number of 165 mg/g were obtained.

Example A3

In Example 1 87 g aconitic acid were substituted for the citric acid while the same process was carried out. 585 g of a product A3 were obtained with an acid number of 97 mg/g.

Component B (Water-Insoluble Polyester Acrylate)

Example B2

266 g trimethylol propane, alkoxylated by 3 mols of ethylene oxide per mol of trimethylol propane, were esterified with 37 g of benzoic acid and 187 g of acrylic acid in the presence of 0.4 g of p-toluenesulphonic acid and 1 g of hydroquinone by means of azeotropic distillation at approx. 130° C. using toluene as azeotrope former up to an acid number of less than 5 mg/g; whereupon the azeotrope former and the unconverted acrylic acid were removed under reduced pressure. 438 g of a water-insoluble polyester acrylate with a hydroxyl number below 20 mg/g were obtained.

Example B2

Analogously to Example B2, 250 g of ditrimethylol propane, 73 g of adipic acid and 144 g acrylic acid were esterified. 413 g of a water-insoluble polyester acrylate with an acid number below 5 mg/g and a hydroxyl number of 140 mg/g were obtained.

Example B3

342 g of ε-caprolactone were added to 134 g of trimethylolpropane at 145° C. and the product obtained was esterified with 216 g acrylic acid up to an acid number under 5 mg/g. 635 g of polyester acrylate with a hydroxyl number below 20 mg/g were obtained.

Examples for the Combinations A+B:

Example C1

60 parts of emulsifying resin A1 were mixed with 40 parts of water-insoluble polyester acrylate B1 at 50° C., 75% of the acid groups (acid number of the mixture: 58 mg/g) were neutralized by the addition of aqueous ammonia and finally diluted to have a mass fraction of solids of 75% by addition of distilled water. An opaque solution with a dynamic viscosity of 3,500 mPa·s and a pH value of 7.8 was obtained.

Example C2

50 parts emulsifying resin A3 were mixed with 50 parts of polyester acrylate B3 at 50° C., 90% of the acid groups (acid number of the solution: 48 mg/g) were neutralized by the addition of aqueous ammonia. After dilution with distilled water to a mass fraction of solids at 75% an opaque solution with a dynamic viscosity of 2,500 mPa·s and a pH value of 7.7 was obtained.

Example C3

692 g emulsifying resin A2 were warmed up to 140° C. with 413 g of polyester acrylate B2 and retained at this temperature until the acid number dropped to 50 mg/g. After neutralizing 85% of the acid groups by aqueous ammonia and diluting the solution with distilled water to have a mass fraction of solids at 75% a clear solution with a dynamic viscosity of 4,500 mPa·s and a pH value of 8.0 was obtained.

A commercial photo initiator(2-hydroxy-2-methyl-1-phenylpropane-1-on with amass fraction of 2% in relation to the solids in the binder solution) was added to the binders C1 through C3 in the set concentration and the mixture was applied to wood and cured at a conveyor belt velocity of 10 to 20 m/s by two mercury lamps of 80 watts each. No "rising" of the wood fibres was observed (rough surface due to uneven swelling) was observed.

After drying and curing there was a transparent, elastic coating which was resistant to scratches as well as to chemicals. Even after irradiation with UV light for 500 hours (test method in accordance with ASTM D 4587) there was no change in the film.

Comparative Examples

Example V1

In accordance with the examples 1 and 3 in the EP-A 0 574 775, a polyester acrylate (®Laromer LR 8799 (V1-1) and a polyether acrylate (®Laromer LR 8812 (V1-2) were each mixed with an emulsifying polyester B1 and warmed up to 70° C. with hexamethylene dansocyanate until no isocyanate could be found in the IR spectrum. The adducts obtained V1-1 and V1-2 were dispersed with a dispersing device in deionised water to form dispersions with a mass fraction of solids of approx. 50%. After the addition of a photo initiator (2-hydroxy-2-methyl-1-phenylpropane-1-on with a mass fraction of 2% in relation to the solids in the binder solution) the mixtures were applied to wood (10–15 g/m$^2$) and cured at a conveyor belt velocity of 10 to 20 m/s by two mercury lamps of 80 watts each.

Example V2

In accordance with DE-A 33 40 589, Example 3, a polyester acrylate was synthesised from 1 mol of maleic anhydride, 0.05 mol of a polyethylene glycol with an average molar mass of 1,500 g/mol, 0.45 mol of 1,2-propanediol, 1 mol of an ethoxylated trimethylol propane (with an average of 4 mols of ethylene oxide per 1 mol of trimethylol propane) and 1.8 mol of acrylic acid in a toluene solution with toluenesufonic acid as catalytic additive. Subsequently the solvent was distilled off under reduced pressure. The polyester acrylate had an acid number of approx. 14 mg/g,. To 250 g of this polyester acrylate aphoto initiator (2-hydroxy-2-methyl-1-phenylpropane-1-on with a mass fraction of 2% in relation to the solids in the binder solution) was added and made into a dispersion using deionised water with a mass fraction of solids at approx. 50%. Subsequently the mixture was applied to wood (10–15 g/m$^2$) and cured at a conveyor belt velocity of 10–20 m/s by two mercury lamps of 80 watts each.

In all comparative examples (V1-1, V1-2, V2) the wood fibres rose on the surface which leads to a rough surface. After artificial "weathering" (irradiation with UV light, 500 hours) the lacquer films are not scratch-resistant.

The above description is intended to be illustrative and not limiting. Various changes or modifications in the embodiments described herein may occur to those skilled in the art. These changes can be made without departing from the scope or spirit of the invention.

What is claimed is:

1. A radiation curable water-soluble or water-dispersible polyester composition AB, which forms high solids solutions or dispersions in water, said composition being obtained by mixing or pre-condensation of
   a water soluble, radiation-curable emulsifying resin A, which contains ester and/or acid groups and has an acid number from about 20 to about 300 mg/g; and
   a radiation-curable polymer B, which contains ester and/or ether groups,
   where resin A is the reaction product of
      an alkoxylated polyol A1, which has at least 3 hydroxyl groups and 3 to 10 oxy-$C_2$–$C_4$-alkylene groups; and
      an $\alpha$, $\beta$-unsaturated carboxylic acid A2, which has a free carboxylic acid group per molecule;
   with
   a carboxylic acid A3, selected from the group consisting of
      carboxylic acids A31, which have at least two carboxylic acid groups, at least one of which constitutes a secondary or tertiary carboxylic acid group and a further acid group selected from the group consisting of carboxylic, sulphonic and phosphoric acid groups; and
      carboxylic acids A32, which have at least two carboxylic acid groups and at least one hydroxyl group, which is acidic due to an adjacent electronegative substituent and displays a $pK_A$ value of maximally about 8,
   and
   where polymer B is a reaction product of
      an aliphatic, linear, branched or cyclic alcohol B1;
   with
      compounds B2, selected from the group consisting of
         $C_2$–$C_4$-alkylene oxide, B21,
         $C_3$–$C_8$-aliphatic, linear, branched or cyclic dicarboxylic acids B22, and
         aliphatic lactones, B23, having 3 to 8 carbon atoms,
   and
      compounds B3 selected from $\alpha$, $\beta$-unsaturated carboxylic acids with 1 to 2 carboxylic acid groups in the molecule.

2. A polyester composition according to claim 1, wherein the emulsifying resin A is mixed with water-insoluble polymer B.

3. A polyester composition according to claim 1, wherein the emulsifying resin A is condensed with water-insoluble polymer B.

4. A polyester composition according to claim 1, wherein the emulsifying resin has an acid number from about 60 to about 250 mg/g.

5. A polyester composition according to claim 1, wherein the emulsifying resin A, is obtained by the condensation of an alkoxylated polyol A1, $\alpha,\beta$-unsaturated carboxylic acids A2 and a carboxylic acid A31 having at least three carboxylic acid groups, one of which is a secondary or tertiary carboxylic acid group.

6. A polyester composition according to claim 1, wherein the emulsifying resin A is obtained by condensation of ethoxylated polyols selected from the group consisting of ethoxylated glycerol, ethoxylated trimethylol propane and ethoxylated pentaerythritol, an $\alpha$, $\beta$-unsaturated carboxylic acid selected from the group consisting of acrylic and methacrylic acid and monomethyl maleate and of a carboxylic acid, selected from the group consisting of tartronic acid, malic acid, the isomers of tartalic acid, citric and isocitric acid, tricarballylic acid and sulfoisophthalic acid.

7. A polyester composition according to claim 1, wherein the polyester B is obtained by a multi-stage reaction which comprises
   a) reacting at least one bivalent aliphatic hydroxy compound B1 with compounds B2, selected from the group consisting of alkenyloxides B21, dicarboxylic acids B22 and lactones B23, to form polyether or polyester polyols; and
   b) taking the polyether or polyester polyols formed above and reacting them with $\alpha$, $\beta$-unsaturated mono- or dicarboxylic acid.

8. A polyester composition according to claim 1, wherein resin A has an acid number from 60 to 250 mg/g.

9. A polyester composition according to claim 5, wherein the alkoxylated polyol A1 is obtained by reaction of alkylene oxides A11 selected from the group consisting of ethylene oxide (oxirane), 1,2-propylene oxide (methyloxirane) and 1,2-butylene oxide (ethyloxirane) and aliphatic polyols A12 selected from the group consisting of glycerine, trimethylol ethane, trimethylol propane, erythritol, pentaerythritol, arabitol, xylitol, adonitol, sorbitol, mannitol, dulcitol, ditrimethylol propane and dipentaerythritol.

10. A polyester composition according to claim 1, wherein the alcohols B1 are selected from the group consisting of ethylene glycol, 1,2-propylene glycol, 1,4-butanediol, 1,6-hexanediol, diethylene glycol, triethylene glycol and neopentyl glycol, the alkylene oxides B21 are selected from the group consisting of oxirane (ethylene oxide), methyloxirane (propylene oxide) and ethyl oxirane (1,2-epoxybutane); the carboxylic acids B22 are selected from the group consisting of glutaric acid, adipic acid, o-, m-, and p-hexahydrophthalic acid, 1,12-dodecanedioic acid, iso- and terephthalic acid, diphenylsulfone dicarboxylic acid and diphenylether dicarboxylic acids; the lactones B23 are selected from the group consisting of $\gamma$-butyrolactone, $\delta$-valerolactone, $\epsilon$-caprolactone and the lactone of the 12-hydroxylauric acid; and compounds B3 are selected from the group consisting of maleic, fumaric, itaconic, citraconic, mesaconic acids, and the aliphatic $C_1$–$C_4$-alcohol, semi-esters of these acids.

11. An aqueous, radiation-curable lacquer, which comprises a copolyester composition according to claim 1.

12. An aqueous, radiation-curable lacquer, which comprises a polyester composition according to claim 1 and a photoinitiator.

13. A method for coating a heat sensitive substrate which comprises applying to said substrate a lacquer according to Claim 11.

14. The method according to claim 11, wherein the substrate is plastics, paper, cardboard, tissues and non-woven (material), leather and wood.

15. The method according to claim 14, wherein the substrate is wood.

* * * * *